(12) United States Patent
Zhang et al.

(10) Patent No.: US 9,922,119 B2
(45) Date of Patent: Mar. 20, 2018

(54) NAVIGATIONAL RANKING FOR FOCUSED CRAWLING

(75) Inventors: Li Zhang, Sunnyvale, CA (US); Shi Cong Feng, Beijing (CN); Yuhong Xiong, Mountain View, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 490 days.

(21) Appl. No.: 12/741,204

(22) PCT Filed: Nov. 8, 2007

(86) PCT No.: PCT/CN2007/071033
§ 371 (c)(1),
(2), (4) Date: May 4, 2010

(87) PCT Pub. No.: WO2009/059481
PCT Pub. Date: May 14, 2009

(65) Prior Publication Data
US 2010/0268701 A1   Oct. 21, 2010

(51) Int. Cl.
*G06F 17/30* (2006.01)

(52) U.S. Cl.
CPC .... *G06F 17/30861* (2013.01); *G06F 17/3089* (2013.01); *G06F 17/30321* (2013.01); *G06F 17/30327* (2013.01); *G06F 17/30864* (2013.01); *G06F 17/30899* (2013.01)

(58) Field of Classification Search
CPC ........... G06F 17/30864; G06F 17/3089; G06F 17/30867; G06F 17/30014; G06F 17/30722; G06F 17/30884; G06F 17/30899; G06F 17/30321; G06F 17/30327
USPC ....................................................... 707/709
See application file for complete search history.

(56) References Cited

U.S. PATENT DOCUMENTS

| | | | |
|---|---|---|---|
| 5,446,891 A * | 8/1995 | Kaplan | G06F 17/30014 |
| 5,895,470 A | 4/1999 | Pirolli et al. | |
| 6,389,409 B1 | 5/2002 | Horovitz et al. | |
| 7,080,073 B1 * | 7/2006 | Jiang | G06F 17/2229 |
| 2004/0111412 A1 * | 6/2004 | Broder | G06F 17/30864 |
| 2005/0028089 A1 * | 2/2005 | Aoki | G06F 17/30899 715/205 |
| 2005/0192824 A1 * | 9/2005 | Schuetze et al. | 705/1 |
| 2005/0246328 A1 * | 11/2005 | Zhang | G06F 17/30867 |
| 2006/0041562 A1 * | 2/2006 | Paczkowski | G06F 17/30884 |

(Continued)

FOREIGN PATENT DOCUMENTS

CN       1437140 A      8/2003
JP       2006072600     3/2006

OTHER PUBLICATIONS

Chakrabarti et al., Focused crawling: a new approach to topic-specific Web resource discovery, Computer Networks 31 (1999) 1623-1640.*

(Continued)

*Primary Examiner* — Srirama Channavajjala (57) ABSTRACT

Systems and methods of navigational ranking for focused crawling are disclosed. In an exemplary embodiment, a method may include using a classifier to distinguish at least one target web page from other web pages on a website. The method may also include modeling the web pages on the website by a directed graph G=(V, E), wherein each web page is represented by a vertex (V), and a link between two web pages is represented by an edge (E). The method may also include assigning each web page (u) in V is assigned a weight p(u) based on the classifier to calculate a navigational ranking indicating relevance of a web page.

24 Claims, 4 Drawing Sheets

(56) References Cited

U.S. PATENT DOCUMENTS

| | | | |
|---|---|---|---|
| 2006/0122998 A1* | 6/2006 | Bar-Yossef et al. | 707/5 |
| 2006/0277175 A1* | 12/2006 | Jiang | G06F 17/2229 |
| 2007/0050338 A1* | 3/2007 | Strohm et al. | 707/3 |
| 2007/0162448 A1* | 7/2007 | Jain et al. | 707/7 |
| 2007/0233808 A1* | 10/2007 | Egnor | G06F 17/30864 709/217 |
| 2008/0027936 A1* | 1/2008 | Liu | G06F 17/30864 |
| 2008/0133460 A1* | 6/2008 | Clark | G06F 17/30864 |
| 2008/0222726 A1* | 9/2008 | Chayes | G06F 17/30864 726/23 |
| 2009/0106235 A1* | 4/2009 | Tankovich | G06F 17/30864 |
| 2009/0164425 A1* | 6/2009 | Olston | G06F 17/30864 |

OTHER PUBLICATIONS

Anshika Pal, Effective Focused Crawling Based on Content and Link Structure Analysis, IJCSIS, vol. 2, No. 1, Jun. 2009.*

Broder et al. ("Graph structure in the Web", Computer Networks 33 (2000) 309-320).*

Chakrabarti et al. ("Focused crawling: a new approach to topic-specific Web resource discovery", Computer Networks 31 (1999) 1623-1640).*

Richard Wheeldon et al., The Best Trail Algorithm for Assisted Navigation of Web Sites, IEEE, Proceedings of the First Latin American Web Congress, published 2002, pp. 1-13.*

Chris H.Q. Ding et al., "Link Analysis: Hubs and Authorities on the World Wide Web", LBNL Tech Report 47847. updated Jul. 2003 pp. 1-12.*

Jon M. Kleinberg, "Authoritative Sources in a Hyperlinked Environment", Journal of the ACM, vol. 46, No. 5, Sep. 1999, 34 pages.

L. Page et al., "The pagerank citation ranking: Bringing order to the web", Technical report, Stanford University Database Group, 1998, 17 pages.

S. Chakrabarti, "Dynamic Personalized PageRank in Entity-Relation Graphs", In WWW conference, pp. 571-580, 2007.

T.H. Haveliwala, "Topic-sensitive PageRank", in WWW conference, pp. 517-526, 2002.

* cited by examiner

NAVIGATIONAL RANKING FOR FOCUSED CRAWLING

BACKGROUND

Although there are a large number of websites on the Internet or World Wide Web (www), users often are only interested in information on specific web pages from some websites. For examples, students, professionals, and educators may want to easily find educational materials, like online courses from a particular university. The marketing department of an enterprise may want to know the evaluations of customers, the comparison between their products and those from their competitors, and other relevant product information. Accordingly, various search engines are available for specific websites.

One approach to discovering domain-specific information is to crawl all of the web pages for a website and use a classification tool to identify the desired or "target" web pages. Such an approach is only feasible with a large amount of computing resources, or if the website only has few web pages. A more efficient way to discover domain-specific information is known as focused crawling. One challenge of implementing efficient focused crawling is to determine the likelihood that a page may quickly lead to target pages.

Two well-known examples are the HITS algorithm and variations of the PageRank algorithm, such as, Personalized PageRank (PPR), and Dynamic Personalized PageRank (DPPR). These algorithms rank pages according to topic relevance or personal interests. Presumably, these algorithms may be used in focused crawling, i.e., by setting the crawling priority of a page according to the score computed by HITS or DPPR. However, these algorithms each have deficiencies.

In the PageRank algorithm, a web page receives a higher rank if the web pages it is linked from have higher ranks. PPR is similar but in addition takes into account the page relevance. The rank computed by PPR indicates the relevance of a web page to a certain topic but it is not a good measure for the "connectness" of a web page to target pages. For example, a terminal page (a web page with no out-going links) may have a very high rank, but it does not lead to any other pages. In addition, PageRank and its variations calculate aggregated score. This is inappropriate for focused crawling. For example, consider two web pages A and B where web page A links to three target pages and three non-target pages, and web page B only links to three target pages. If the rank is calculated according to the PageRank model, web page A will receive a higher rank than web page B. However, from the perspective of crawling, web page B should be ranked higher as it is "purer" than A and leads to target pages.

In addition, PPR and DPPR are one-directional (from ancestors to offspring) score propagation algorithms. Hence, it is hard to identify the hub pages. However, hub pages are often very useful in focused crawling because hub pages are most likely to lead to target pages.

The HITS algorithm, on the other hand, is a two-directional (between ancestors and offspring) score propagation algorithm, and it can be used to identify both hubs and authorities on certain topics. Intuitively, hubs are the web pages that should be identified and explored in focused crawling. However, the HITS algorithm has a similar problem to PageRank in that it calculates aggregated scores. In addition, in the HITS algorithm, the target pages are used as the "seed" to form a sub-structure surrounding them, and the scores are only computed for those nodes in the sub-structure. In focused crawling, a score should be computed for every page, often far away from target pages. Accordingly, the HITS algorithm does not work well in such a case.

DETAILED DESCRIPTION

Systems and methods of navigational ranking for focused crawling are disclosed. Exemplary embodiments of navigational ranking proactively look for target pages in a website by following links through web pages that are more likely to lead to target pages. The likelihood of a web page leading to a target page is measured based on the link structure of the website. The focused crawler implementing navigational ranking can discover most target pages by only exploring a small portion of the available web pages, therefore reducing the time and resources (and hence cost) needed to crawl the website.

Figure 1:
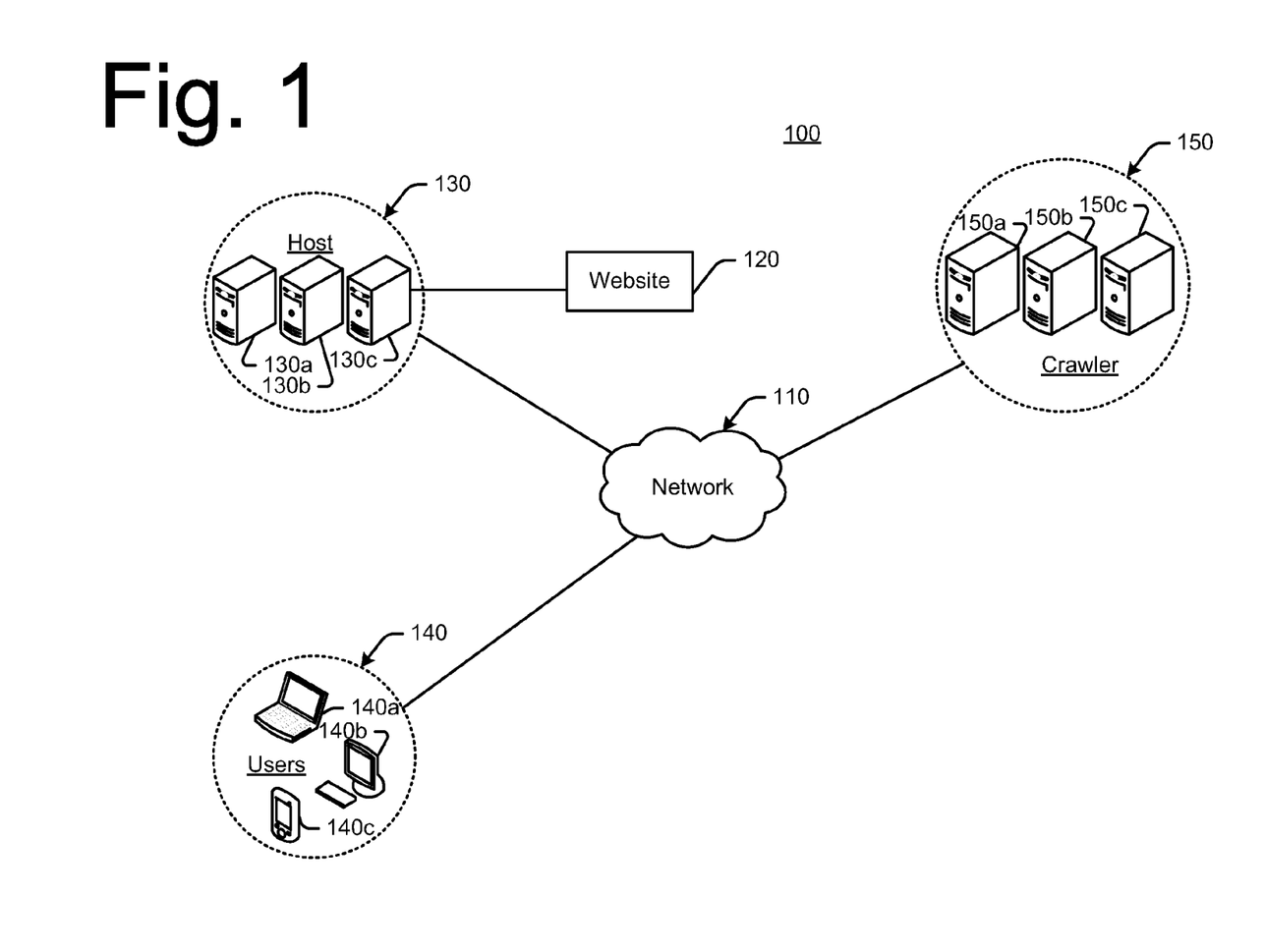
FIG. 1 is a high-level diagram of an exemplary networked computer system in which navigational ranking for focused crawling may be implemented.

FIG. 1 is a high-level illustration of an exemplary networked computer system 100 (e.g., via the Internet) in which navigational ranking for focused crawling may be implemented. The networked computer system 100 may include one or more communication networks 110, such as a local area network (LAN) and/or wide area network (WAN), for connecting one or more websites 120 at one or more host 130 (e.g., servers 130a-c) to one or more user 140 (e.g., client computers 140a-c).

The term "client" as used herein (e.g., client computers 140a-c) refers to one or more computing device through which one or more users 140 may access the network 110. Clients may include any of a wide variety of computing systems, such as a stand-alone personal desktop or laptop computer (PC), workstation, personal digital assistant (PDA), or appliance, to name only a few examples. Each of the client computing devices may include memory, storage, and a degree of data processing capability at least sufficient to manage a connection to the network 110, either directly or indirectly. Client computing devices may connect to network 110 via a communication connection, such as a dial-up, cable, or DSL connection via an Internet service provider (ISP).

The focused crawling operations described herein may be implemented by the host 130 (e.g., servers 130a-c which also host the website 120) or by a third party crawler 150 (e.g., servers 150a-c) in the networked computer system 100. In either case, the servers may execute program code which enables focused crawling of one or more website 120 in the networked computer system 100. The results may then be stored (e.g., by crawler 150 or elsewhere in the network) and accessed on demand to assist the user 140 when searching the website 120.

The term "server" as used herein (e.g., servers 130a-c or servers 150a-c) refers to one or more computing systems with computer-readable storage. The server may be provided on the network 110 via a communication connection, such as a dial-up, cable, or DSL connection via an Internet service provider (ISP). The server may be accessed directly via the network 110, or via a network site. In an exemplary embodiment, the website 120 may also include a web portal on a third-party venue (e.g., a commercial Internet site) which facilitates a connection for one or more server via a back-end link or other direct link. The servers may also provide services to other computing or data processing systems or devices. For example, the servers may also provide transaction processing services for users 140.

When the server is "hosting" the website 120, it is referred to herein as the host 130 regardless of whether the server is from the cluster of servers 130a-c or the cluster of servers 150a-c. Likewise, when the server is executing program code for focused crawling, it is referred to herein as the crawler 150 regardless of whether the server is from the cluster of servers 130a-c or the cluster of servers 150a-c.

The program code may execute the exemplary operations described herein for navigational ranking for focused crawling. In exemplary embodiments, the operations may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used.

In focused crawling, the program code needs to efficiently identify target web pages. This is often difficult to do because target web pages are typically located "far away" from the website's home page. For example, web pages for university courses are on average about eight web pages away from the university's home page, as illustrated in FIG. 2.

Figure 2:
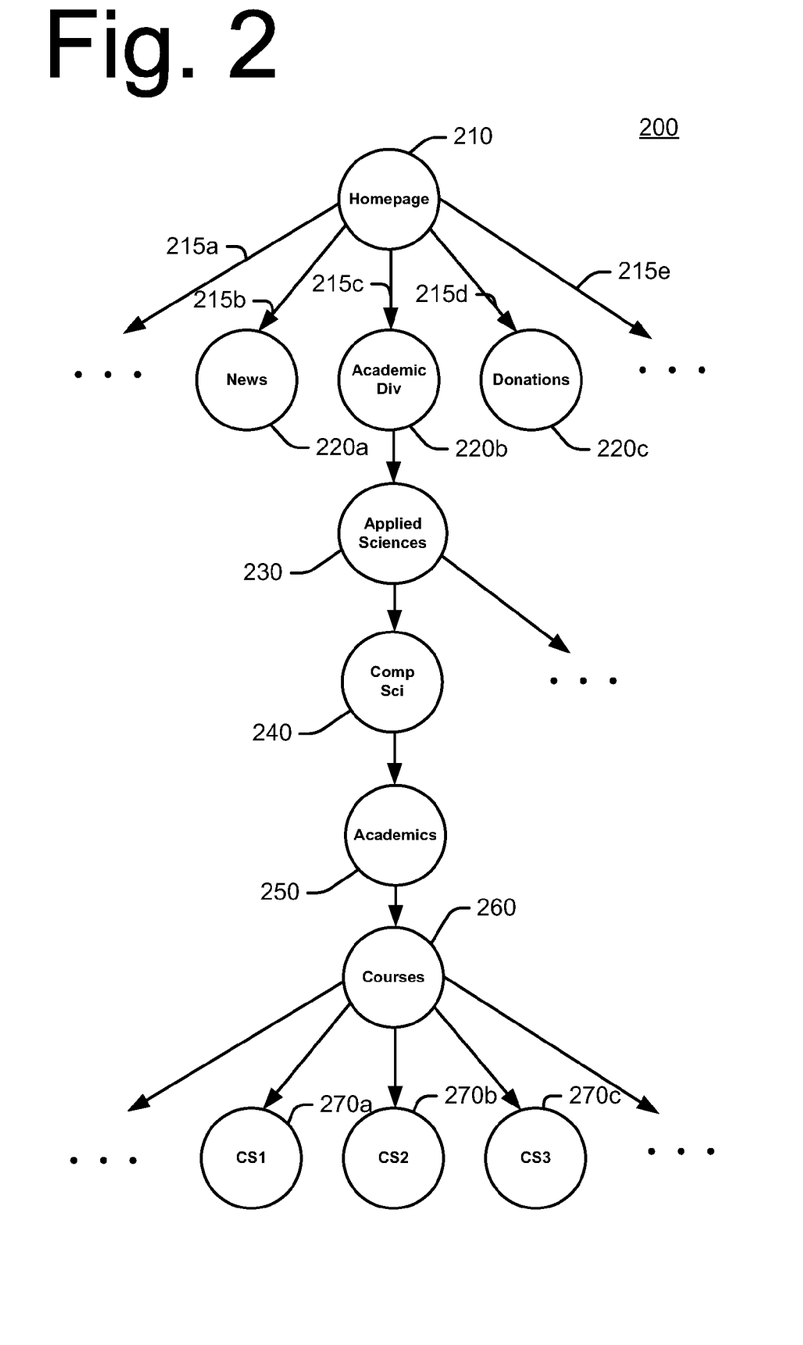
FIG. 2 is an organizational layout for an exemplary website.

FIG. 2 is an organizational layout 200 for an exemplary website, such as the website 120 shown in FIG. 1. In this example, the website is a university website having a home page 210 with a number of links 215a-e to different child web pages 220a-c. At least some of the child web pages may also link to child web pages, such as web page 230, and then web pages 240-260, and so forth. The target web pages 270a-c are linked to through web page 260.

Here it can be seen that the shortest path from the university's home page 210 (the "root") to the target web page 270a containing course information (e.g., for CS1) is <Homepage> <Academic Division> <Engineering & Applied Sciences> <Computer Sciences> <Academic> <Course Websites> <CS1>. According to the systems and methods described herein, a focused crawler is able to discover the target page 270a by following this shortest path from the root and assigning each web page a navigational rank. Navigational rank is described in more detail below, and can be used to determine how each page is likely to lead to target pages.

In an exemplary embodiment, the navigational rank may be determined as follows. Assuming that a classifier is available for distinguishing target pages from other web pages, the web pages on a website can be modeled by a directed graph G=(V, E). That is, each web page is represented by a vertex V, and a link between two web pages is represented by an edge E. Each web page or node u in V is assigned a weight p(u), by a classifier, to indicate the relevance of the page. The higher the weight, the higher the relevance (i.e., that the web page is a target). The weight can be a binary or real number dependent on the classifier.

Given such a graph with vertex weights, for each vertex u in V, its Navigational Rank NR(u) is calculated by the following iterative process:
1. for all u, NR(u)(0)←1
2. t←0
3. for all u, NR(u)(t+1)=d*p(u)+(1−d) avg[NR(w)(t)/Ni(w)]
4. normalize NR(u)(t+1) such that they average to 1
5. if for all u, |NR(u)(t+1)−NR(u)(t)|<e, stop, and let NR(u)=NR(u)(t+1)
6. otherwise, t←t+1, return to step 3

In these calculations, w represents all of the vertices pointed to by u; d is a damping factor (typically a small constant, such as 0.2); Ni(w) is the number of links pointing to w; and e is an error bound, which was selected as $10^{-5}$ for purposes of illustration here.

In the above, steps 1 and 2 initialize the process. In step 3 the navigational rank is computed as a linear combination of the initial relevance rating p and a valued derived from the navigational rank of the neighbors computed in the last iteration. In steps 4 and 5 it is determined if the convergence condition has been met.

The intuition is that each node is rewarded by pointing to nodes with a high score and penalized by pointing to nodes with a low score, where the score is recursively defined. For any weight p, the above iterative process typically converges, and the convergence is usually rapid.

Figure 3:
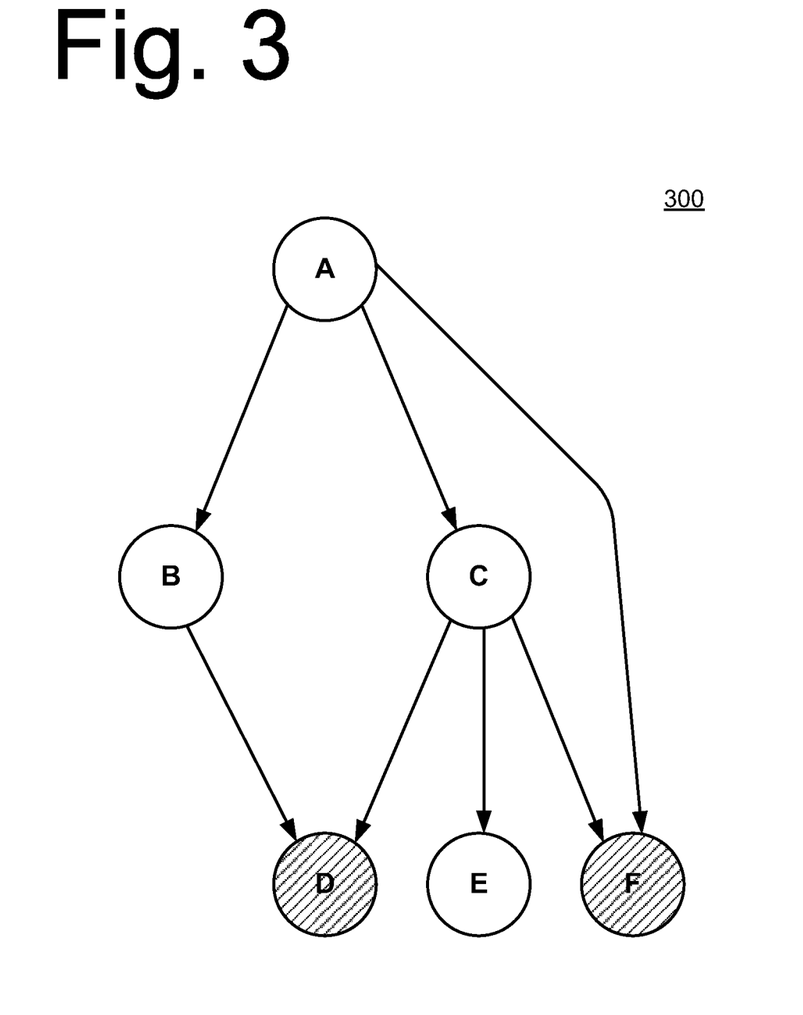
FIG. 3 is a block diagram illustrating exemplary navigational ranking for focused crawling on a website using a static model.

The above process can be better understood with reference to the following illustration. FIG. 3 is a website graph (G) 300 which may be used to illustrate exemplary navigational ranking calculations using a static model, where all of the web pages from the website are downloaded to generate graph 300. In graph 300, node A is the root and nodes D and F are target web pages.

Table 1 shows the value of p, the intermediate value of NR after the first two iterations in the process described above, and the final NR calculation (d=0.2). In Table 1, there are two rows for each value of t, where the upper row shows the value of NR after step 3, and the lower row shows the normalized value of NR after step 4.

TABLE 1

Exemplary NR Calculation

| P | A<br>0 | B<br>0 | C<br>0 | D<br>1 | E<br>0 | F<br>1 |
|---|---|---|---|---|---|---|
| t = 1 | 0.67 | 0.40 | 0.53 | 0.20 | 0.00 | 0.20 |
|  | 2.00 | 1.20 | 1.60 | 0.60 | 0.00 | 0.60 |
| t = 2 | 0.83 | 0.24 | 0.16 | 0.20 | 0.00 | 0.20 |
|  | 3.05 | 0.89 | 0.59 | 0.74 | 0.00 | 0.74 |
| t = ∞ | 0.64 | 0.31 | 0.21 | 0.20 | 0.00 | 0.20 |
|  | 2.46 | 1.20 | 0.80 | 0.77 | 0.00 | 0.77 |

As can be seen from the exemplary calculations in Table 1, while nodes D and F are the only two relevant pages, their NR values are relatively low. Indeed, NR measures how likely a page may lead to target pages, not how likely a web page is to be a target page.

In this example, all of the pages in the website had to first be downloaded to obtain the graph 300 shown in FIG. 3. This model, referred to as the "static" model, is suitable where domain-specific crawling is implemented on many similar sites. For example, the crawler may implement the static model to crawl course pages from all university websites. Several entire websites may be downloaded and used to calculate navigation ranks by the above procedure. Then, a machine learning process may be invoked to discover the relation between navigation rank and the features of a webpage, such as its URL name, anchor texts, or content. Then, for a new website, the learned results are used to approximate the navigational rank of each page encountered in the crawling process. Web pages with higher ranks are expanded during the crawling.

In other circumstances where it is not desired to download all of the pages in a website to obtain a graph G, such as the graph 300 shown in FIG. 3, the navigational rank may be calculated according to an "active" model. In the active model, the structure for each individual site is determined by dynamically adjusting the nodes' navigational rank while crawling the site. The navigational ranks reflect more accurately the structure of the web site.

However, there is a problem in applying the definition of NR in the static model directly in the active model. That is, for every URL that has not been downloaded, there are no "out" links since the corresponding web pages have not been downloaded and parsed. The value of NR of those pages will always be 0 according to the static definition of NR, which is not useful for discerning which page is more likely to lead to target pages.

To address with this issue, additional calculations may be implemented to propagate the NR scores during crawling. Navigational rank for the active model (designated NR') is calculated as follows:

1. for all u, NR'(u)(0)←1
2. t←0
3. for all u, NR'(u)(t+1)=d*NR(u)+(1−d) avg[NR'(v)(t)/No(v)]
4. normalize NR'(u)(t+1) such that they average to 1
5. if for all u, |NR'(u)(t+1)−NR'(u)(t)|<e, stop, and let NR'(u)=NR'(u)(t+1)
6. otherwise, t←t+1, return to step 3

In these calculations, NR'(u) is the Navigational Rank of vertex u computed by the first algorithm; v is all of the vertices pointing to u; and No(v) is the number of links pointing away from v.

The iteration is very similar to the process described above. The difference is that the direction of score propagation is reversed. Previously, the average is taken from the out-neighbors (the neighbors which are pointed away from u); in the above process, the average is taken from the in-neighbors (the neighbors which point to u).

Figure 4:
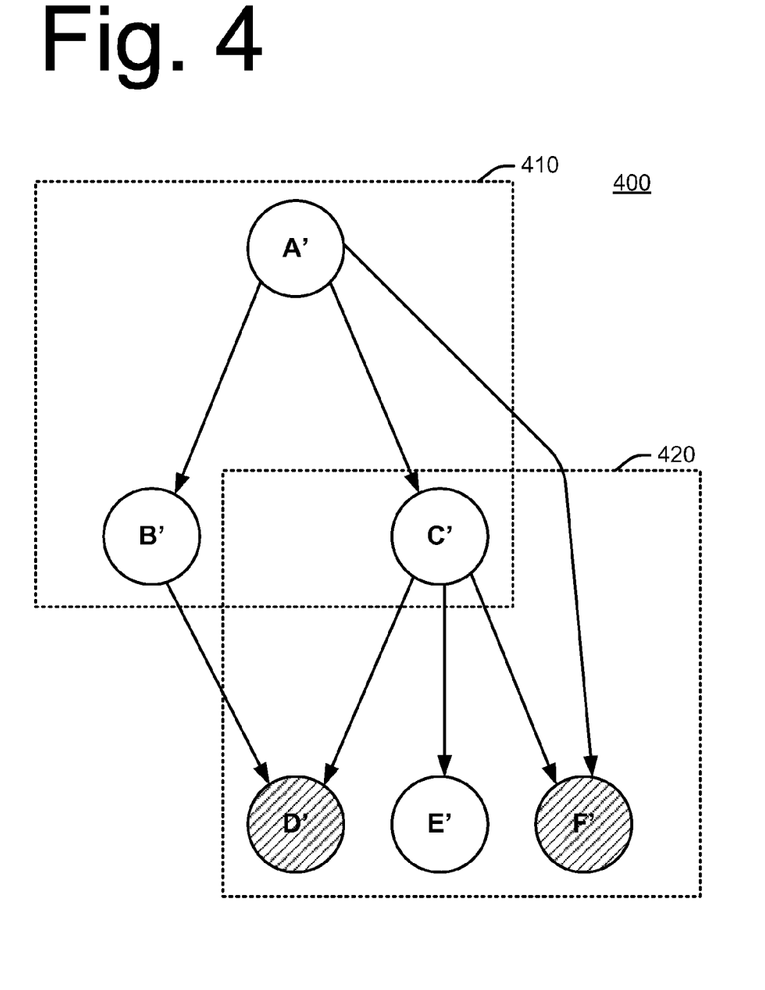
FIG. 4 is a block diagram illustrating exemplary navigational ranking for focused crawling on a website using an active model.

The active model may be implemented in focused crawling for calculating navigational rank in real-time (i.e., as subsets of the website are downloaded). FIG. 4 is a website graph (G') 400 which may be used to illustrate exemplary navigational ranking calculations using an active model, where subsets (e.g., subsets 410 and 420) of the web pages are sequentially downloaded from the website to generate graph 400. Again, node A' is the root of the subset and nodes D' and F' are target web pages. Note that node A' may be the home page, but does not need to be the home page of the website. Accordingly, navigational ranking may be implemented faster and more efficiently, even when the entire web page is not available.

First a standard breadth first search method is used to download the first subset of pages 410. Then a classifier is invoked and the navigational rank of each node in the subset of graph 400 is calculated. The crawler then downloads more web pages (e.g., the second subset 420) by following links on the web pages in the first subset 410 with higher navigational ranks until the number of new pages reaches a threshold value. This threshold value may be any suitable number of web pages based on design considerations (e.g., processing power, desired time to completion, etc.). Each web page's navigational rank is then recalculated on the expanded graph, and the crawling process is repeated (downloading more subsets and calculating NR) until sufficient target pages are located.

In an alternative embodiment, the relation between the navigational rank and the features of web pages may be determined, similar to the static model, and the results used to guide the crawling. After the second-step propagation, NR scores computed in the first step are distributed to the nodes following the links. If these pages are not downloaded yet, they can be assigned higher NR scores and crawled first in the next crawling cycle.

Exemplary embodiments of navigational ranking may also implement an average score, not the summation, in an iterative computation to determine page rank. Using the previous illustration of the prior art, where web page u had two child web pages that are targets and three child web pages that are noise, u was ranked at 5 units; and where web page v had three child web pages and all three are targets, v was ranked at 3 units, both using a summation approach. Accordingly, web page u was erroneously selected as the target web page. According to the teachings herein, however, web page u is ranked ⅖ using an averaging approach (i.e., two targets out of five total child web pages); and web page v would be ranked ⅗ (or 1, i.e., three targets out of three total child web pages), so higher than web page u. Accordingly, the navigational ranking using an averaging approach provides more accurate results during a focused crawl.

Also in exemplary embodiments, navigational ranking may implement a one-direction score propagation strategy, from offspring to ancestors. A web page is ranked higher if it points to pages with a high score. Therefore, the hub pages can be effectively identified. Alternatively, navigational ranking may implement a two-direction and two-step score propagation strategy. Again, a web page is ranked higher if it points to pages with a high score so that the hub pages can be effectively identified. Next, the score obtained in the first step is distributed from ancestors to offspring. Therefore, a potential target page will likely be crawled because it is pointed to by high scoring pages. Moreover, this two-step score propagation is more effective than the one-step used in HITS.

It is understood that the embodiments shown and described herein are intended only for purposes of illustration of exemplary systems and methods and are not intended to be limiting. In addition, the operations and examples shown and described herein are provided to illustrate exemplary implementations of navigational ranking for focused crawling. It is noted that the operations are not limited to those shown. Other operations may also be implemented. Still other embodiments of navigational ranking for focused crawling are also contemplated, as will be readily appreciated by those having ordinary skill in the art after becoming familiar with the teachings herein.

In addition to the specific embodiments explicitly set forth herein, other aspects and implementations will be apparent to those skilled in the art from consideration of the specification disclosed herein.

The invention claimed is:

1. A method comprising:
    accessing, by a computing device, a plurality of web pages; and
    determining, by the computing device, for each web page of the plurality of web pages, a navigational rank to a root node by,
        (a) determining a number of links pointing to the plurality of web pages;

(b) setting an initial navigational rank of the web page to an initial value;

(c) identifying navigational ranks of the web pages to which the web page points;

(d) calculating a navigational rank of the web page based on a weight p(u) assigned to the web page (u) and an average of the identified navigational ranks of the web pages to which the web page points divided by the determined number of links pointing to the plurality of web pages;

(e) normalizing the calculated navigational ranks of the web pages so that the calculated navigational ranks average to a certain numerical value;

(f) determining whether a difference between the normalized navigational rank and the initial navigational rank of the web page is below a predefined error bound;

(g) in response to the determined difference being less than the predefined error bound, setting the navigational rank of the web page to be the calculated navigational rank;

(h) in response to the determined difference being below the predefined error bound; and repeating (c) to (h) for the web page based on the calculated navigational ranks of the web pages until the differences between the normalized navigational ranks and the initial navigational ranks of the plurality of web pages are each below the predefined error bound.

2. The method of claim 1, wherein a higher weight p(u) corresponds to higher relevance of the web page to the root node.

3. The method of claim 1, further comprising assigning each web page of the plurality of web pages a respective weight p(u) that corresponds to a likelihood that the web page is a target web page of the root node.

4. The method of claim 1 wherein the weight p(u) is a binary number or a real number.

5. The method of claim 1 wherein calculating the navigational rank further comprises calculating the navigational rank according to a static model, wherein under the static model, the plurality of web pages are downloaded and the navigational ranks of the plurality of web pages are determined from the downloaded plurality of web pages.

6. The method of claim 5, further comprising calculating the navigational rank according to the static model where domain-specific crawling is implemented on many similar sites.

7. The method of claim 5, further comprising determining the navigational rank of each of the plurality of web pages according to an active model based on the static model.

8. The method of claim 7, wherein in the active model, a structure for each individual website is determined by dynamically adjusting a navigational rank of a node while crawling the website.

9. The method of claim 8, wherein the active model is used in focused crawling for calculating navigational rank in real-time as subsets of the website are downloaded.

10. The method of claim 7, wherein determining the navigational rank according to the active model is based on subsets of a website sequentially downloaded from the website to generate a graph of the website.

11. The method of claim 1, further comprising modeling the plurality of web pages by a directed graph, wherein each of the plurality of web pages is represented by a vertex and links between the plurality of web pages are represented by edges.

12. The method of claim 1, wherein calculating the navigational rank comprises using a one-direction score propagation strategy, from offspring to ancestor web pages.

13. The method of claim 1, further comprising discovering a target page by following a shortest path from the root node and the navigational ranks of the web pages.

14. The method of claim 1, further comprising approximating a navigational rank of each page encountering while crawling a new website, wherein a web page from the new website having a highest navigational rank is expanded.

15. A system of navigational ranking for focused crawling, comprising:

a processor;

a non-transitory computer-readable data storage medium storing program code executable by the processor to:

access a plurality of web pages on a web site;

assign each web page of the plurality of web pages a weight indicating relevance of the web page to a root web page;

for each web page of the plurality of web pages, determine a navigational rank to the root web page, wherein to determine the navigational rank of each web page to, (a) determine a number of links pointing to the plurality of web pages;

(b) set an initial navigational rank of the web page to an initial value;

(c) identify navigational ranks of the web pages to which the web page points;

(d) calculate a navigational rank of the web page based on a weight assigned to the web page and an average of the identified navigational ranks of the web pages to which the web page points divided by the determined number of links pointing to the plurality of web pages;

(e) normalize the calculated navigational ranks of the web pages so that the calculated navigational ranks average to a certain numerical value;

(f) determine whether a difference between the normalized navigational rank and the initial navigational rank of the web page is below a predefined error bound:

(g) in response to the determined difference being less than the predefined error bound, set the navigational rank of the web page to be the calculated navigational rank;

(h) in response to the determined difference being below the predefined error bound; and repeat (c) to (h) for the web page based on the calculated navigational ranks of the web pages until the differences between the normalized navigational ranks and the initial navigational ranks of the plurality of web pages are each below the predefined error bound.

16. The system of claim 15, wherein a higher weight corresponds to higher relevance of the web page to the root web page.

17. The system of claim 15, wherein the program code is further to cause the processor to assign each web page of the plurality of web pages a respective weight that corresponds to a relevance that the web page is a target web page of the root web page.

18. The system of claim 15 wherein the weight is a binary number or a real number.

19. The system of claim 15, wherein to calculate the navigational rank, the program code is further to cause the processor to calculate the navigational rank according to a static model, wherein under the static model, the plurality of web pages are downloaded and the navigations ranks of the plurality of web pages are determined from the downloaded plurality of web pages.

20. The system of claim 15, wherein the program code is further to cause the processor to determine the navigational rank of each of the plurality of web pages according to an active model.

21. The system of claim 20, wherein to determine the navigational rank according to the active model, the program code is further to cause the processor to determine the navigational rankings based on subsets of the website sequentially downloaded from the website to generate a graph of the website.

22. A non-transitory computer-readable data storage medium on which is stored machine readable instructions that when executed by a processor cause the processor to:
  access a plurality of web pages on a website;
  assign each web page of the plurality of web pages a weight indicating relevance of the web page to a root web page;
  for each web page of the plurality of web pages, determine a navigational rank to the root web page, wherein to determine the navigational rank of each web page, the processor is to,
   (a) determine a number of links pointing away from the plurality of web pages;
   (b) set an initial navigational rank of the web page to an initial value;
   (c) identify navigational ranks of the web pages that point to the web page;
   (d) calculate a navigational rank of the web page based on the initial value a weight assigned to the web page and an average of the identified navigational ranks of the web pages to which the web page points divided by the determined number of links pointing to the plurality of web pages;
   (e) normalize the calculated navigational ranks of the web pages so that the calculated navigational ranks average to a certain numerical value;
   (f) determine whether a difference between the normalized navigational rank and the initial navigational rank of the web page is below a predefined error bound;
   (g) in response to the determined difference being less than the predefined error bound, set the navigational rank of the web page to be the calculated navigational rank;
   (h) in response to the determined difference being below the predefined error bound; and
   repeat (c) to (h) for the web page based on the calculated navigational ranks of the web pages until the differences between the normalized navigational ranks and the initial navigational ranks of the plurality of web pages are each below the predefined error bound.

23. The non-transitory computer-readable data storage medium of claim 22, wherein the instructions are to cause the processor to:
  calculate the navigational rank according to a static model, wherein under the static model, the plurality of web pages are downloaded and the navigational ranks of the plurality of web pages are determined from the downloaded plurality of web pages.

24. The non-transitory computer-readable data storage medium of claim 23, wherein the instructions are to cause the processor to:
  determine the navigational rank of each of the plurality of web pages according to an active model based on the static model.

* * * * *